(12) United States Patent
Yamakawa et al.

(10) Patent No.: US 8,224,772 B2
(45) Date of Patent: Jul. 17, 2012

(54) DATA MANAGEMENT APPARATUS, METHOD AND PROGRAM

(75) Inventors: Satoshi Yamakawa, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 335 days.

(21) Appl. No.: 12/518,144

(22) PCT Filed: Nov. 30, 2007

(86) PCT No.: PCT/JP2007/073174
§ 371 (c)(1),
(2), (4) Date: Oct. 6, 2009

(87) PCT Pub. No.: WO2008/069125
PCT Pub. Date: Jun. 12, 2008

(65) Prior Publication Data
US 2010/0094803 A1    Apr. 15, 2010

(30) Foreign Application Priority Data
Dec. 8, 2006    (JP) ................................. 2006-332062

(51) Int. Cl.
G06F 7/00    (2006.01)
G06F 17/00    (2006.01)
(52) U.S. Cl. ...................................................... 707/609
(58) Field of Classification Search .................... 707/609
See application file for complete search history.

(56) References Cited

U.S. PATENT DOCUMENTS
2002/0026443 A1*  2/2002  Chang et al. .................... 707/10

FOREIGN PATENT DOCUMENTS
JP    1999327997 A    11/1999
JP    2004362563 A    12/2004

OTHER PUBLICATIONS

International Search Report for PCT/JP2007/073174 mailed Feb. 5, 2008.
K. Konishi, et al., "Integration of Heterogeneous Information Sources (MediPresto/M)", NTT R&D, vol. 52, No. 2, Feb. 10, 2003, p. 107-114.
M. Tsunakawa, et al., "Metadata o Katsuyo shita Koritsuteki na Contents Kanri o Jiitsugen suru Mediaset Kanri (MAM) System", NTT Gijutsu Journal, vol. 16, No. 6, Jun. 1, 2004. p. 32-35.
K. Tsuruoka, et al., "On Physical Structure Virtualization for Object-Oriented Database Management Systems", Information Processing Society of Japan Kenkyu Hokoku, vol. 89, No. 70, Sep. 8, 1989.

* cited by examiner

*Primary Examiner* — John Cottingham
*Assistant Examiner* — Nicholas Allen

(57) ABSTRACT

Disclosed is a data management apparatus comprising a message transfer/analysis unit that receives an object data access request from a client and returns a response; an object metadata storage unit that stores, as metadata, a set of ancillary information on data for an object and a data area corresponding to the ancillary information; an object metadata management unit that performs reading, updating, and registration processing for the metadata; a data conversion unit that sends the data access request to a data access unit, extracts object data; and a data access unit that sends a data access command, specified by the data conversion unit, to a file server or a database server and sends response data, received from the file server or the database server, to the data conversion unit.

8 Claims, 8 Drawing Sheets

FIG.3A

| OBJECT ID INFORMATION | DATA FORMAT INFORMATION | DATA FORMAT SUPPLEMENTARY INFORMATION | DATA STORAGE LOCATION ADDRESS INFORMATION |
|---|---|---|---|
| XXXXXXX | FILE | video/avi | ¥¥ServerA¥DirA¥FileA |
| YYYYYY | DB | (Key1 Int, Key2 Char, Key3 Int) | ¥¥NodeA¥DBA¥TableA |
| ...... | | | |

| ANCILLARY INFORMATION CLASSIFICATION NAME | ANCILLARY INFORMATION | DATA PART INFORMATION | OBJECT ID |
|---|---|---|---|
| Key A | Value A | 0,100 | XXXXXXX |
| Key A | Value B | 50,120 | XXXXXXX |
| Key B | Value C | Select Key1, Key2 From TableA Where Key2=B | YYYYYY |
| ...... | | | |

201

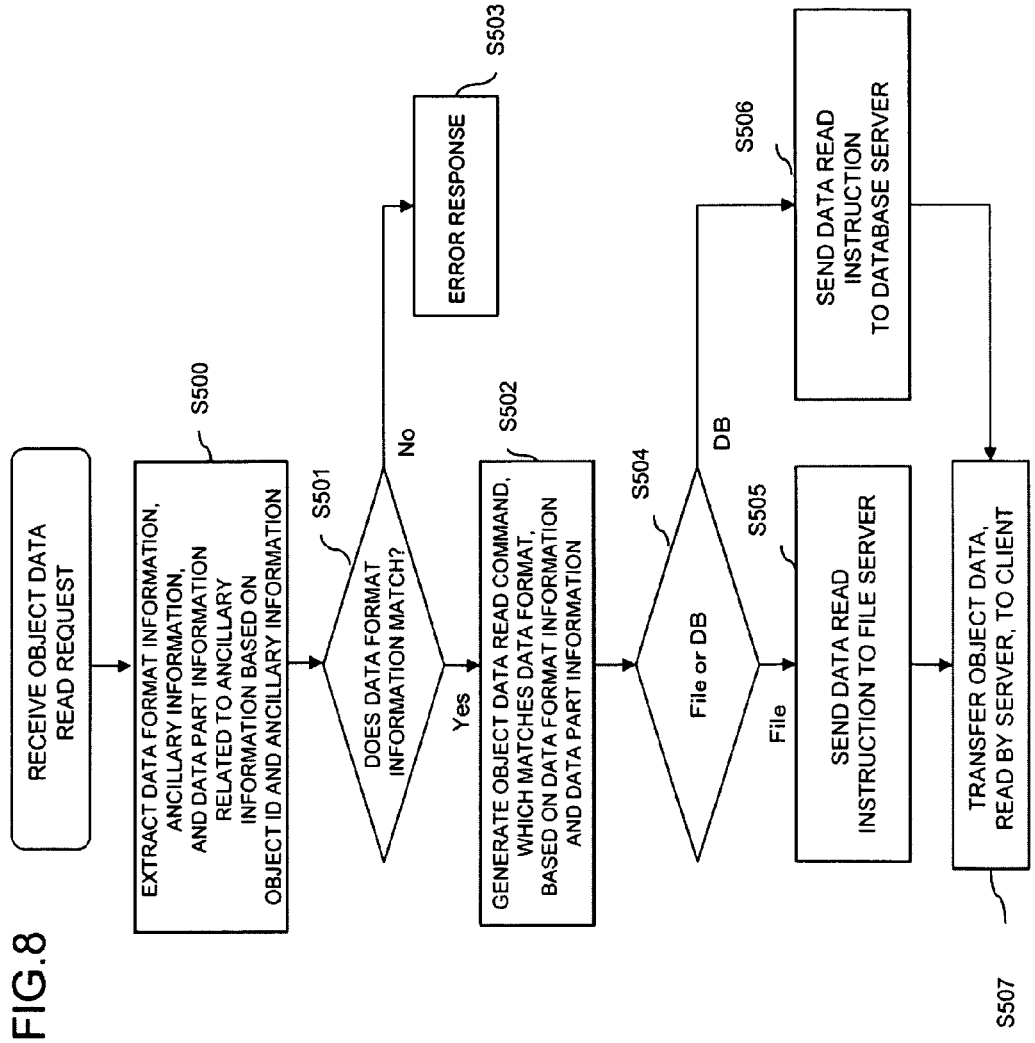

DATA MANAGEMENT APPARATUS, METHOD AND PROGRAM

The present application is the National Phase of PCT/JP2007/073174, filed Nov. 30, 2007, which claims priority from Japanese patent application 2006-332062 (filed on Dec. 8, 2006) the content of which is hereby incorporated in its entirety by reference into this application.

TECHNICAL FIELD

The present invention relates to an information processing technology, and more particularly to an apparatus and a program for consolidating data storage apparatuses having different data storage means, such as a file and a database, for integrally managing heterogeneous forms of data.

BACKGROUND ART

In general, data generated by applications or users for some purposes is stored in various data storage systems according to the data types, purposes of later use of data, and management purposes. For example, the following data storage systems are widely used today:

File system in which data is stored in units of files and data is stored in a tree format called a "directory tree".

Relational database in which tables, each composed of multiple-column records, are created by defining and formatting data according to given meaning or purposes.

A file system is widely used as a storage destination of data created by applications or users, because in general there is no limit on the size of data that can be stored in a practical range and because data may be stored in a data structure called a "file" that has not a special data structure.

Data stored in a file system is managed using a tree format, called a "directory tree", in which file names are used as nodes. This means that, when extracting data, the user cannot access data, unless the user does not specify the location of data, that is, a pathname on the directory tree, in order to access data, based on the file name mapped on the directory tree.

The file system manages not only data itself but also the following data as metadata.

File name
File size
Time data such as data update time
Data on a person, such as a data owner, responsible for data processing However, data is extracted basically by specifying a pathname only.

For this reason, when data is processed by an application via a file system, the user can extract data quickly by recognizing the pathnames of necessary files. However, when the user wants to extract data based on information on non-pathname data, the extraction processing takes long even if the information is metadata managed in the file system.

As described above, a file system, though higher in the flexibility of data that can be stored, is inferior in the ability to search for data.

A relational database is a storage system for use in a data usage environment where contents of data can be structured. In a relational database, data is represented in the form of records, classified and arranged in advance according to pre-determined items, and multiple records are managed as a two-dimensional table for fast data search.

In a relational database, all items used for classifying and arranging data may be used as an information extraction key and, so, only the required information can be extracted very quickly. For this reason, a relational database, a storage system best suited for storing and using structured data, is widely used as a storage system especially for an application that performs routine work.

However, a relational database, which limits the size of data that may be stored in a record, is ineffective means for storing non-structured data.

As a result, a relational database, though superior to a file system in the ability to search for data, is lower in the flexibility of data that can be stored.

Today, the best storage system for the requirements to be satisfied by a particular system is selected, and data is stored in various data storage methods, as described above.

In a data sharing environment in which data, stored in those storage systems, is used by multiple other systems, each application must work with the data creation source system to convert the data format used by the data creation source to the data format used by the data usage location.

To solve this problem, Patent Document 1 discloses a system in which data stored in multiple storage systems, which have different data types and different data access means, is mapped to a single data representation so that the data can be processed as objects. And, by newly providing a single data access interface via which data is accessed on an object basis, the system hides data access means, specific to each storage system, from applications to allow data to be shared among applications which use different data formats and run in different storage systems.

Patent Document 2 discloses UIMA (Unstructured Information Management Architecture) used to develop applications that integrate the search and analysis of a combination of structured information (DB) and unstructured information (documents). UIMS (Unstructured Information Management System) includes search engines, data storage areas, analysis engines including pipelined document annotators, and various adapters. A search inquiry includes search operators (Boolean predicate that functions as weighted AND) composed of multiple search partial expressions each of which has an associated weight value. The search engine returns one or more documents having a weight value sum that exceeds the threshold weight value sum.

Patent Document 1:
Japanese Patent Kokai Publication No. JP-A-H11-327997
Patent Document 2:
Japanese Patent Kokai Publication No. JP2004-362563A

SUMMARY

The disclosed contents of Patent Documents 1 and 2 given above are hereby incorporated by reference into this specification. The following gives an analysis of the technology related to the present invention.

As described above, in a storage system environment in which multiple data formats and multiple data access means are used, an environment in which multiple applications share data can be built through an approach that maps data to common-format objects and integrates data access means.

However, when various types of data are created on the assumption that applications, connected to such an environment, provide services that differ with each other, an application that uses data must know the content of the data, for example, For what purpose is the data created
What information does the data include
in order to make full use of the data.

In addition,
if an object created by an application is extremely large data or
if an application that makes use of data requires only a part of data of an object, the function is required that processes the data content to acquire only a part of the data.

It is an object of the present invention to provide a data management apparatus, method, and program that enable an application to access desired data without cooperation with another application when a data management apparatus, which maps data to common-format objects and has means for consolidating data access means, is applied to an environment in which multiple data formats and multiple data access means are used.

It is another object of the present invention to provide a data management apparatus, method, and program that, when a new application is introduced, allow already created data to be used as data assets by adding ancillary information to objects.

It is still another object of the present invention to provide a data management apparatus, method, and program that reduce unnecessary data reading processing while achieving the objects described above.

According to the present invention, there is provided an apparatus that consolidates data storage devices with different data storage means, such as a file and a database, for integrally managing different types of data. In order to use stored data as information having specific meaning, the apparatus manages a meaning and a data area related to the meaning and performs data access control.

More specifically, the present invention is applied to a data management apparatus having a means that that maps data to common-format objects for consolidating data access means in an environment which holds multiple data formats and multiple data access means. This data management apparatus comprises a means that preserves ancillary information used by an application which creates data or which analyzes the contents of created data, to represent or describe the contents of data for an object and information (data part information) used to indicate to which area of the object the ancillary information is related.

In the present invention, a plurality of pieces of ancillary information may be given to one object when the ancillary information is assigned.

In addition, the data management apparatus comprises a means that allows an application, which uses data, to search the objects stored in the storage system for an object, required by the application, based on the ancillary information; and a data read means that can read only a part of object data based on the ancillary information and the data part information related to the ancillary information.

A computer program of the present invention causes a computer to execute the processing comprising:

mapping data with multiple data formats to common-format objects for consolidating data accesses; and allowing an application, which creates data or analyzes the contents of created data, to assign ancillary information, used to represent or describe the contents of data, to an object, and saving the ancillary information along with data part information that indicates to which data area of the object the ancillary information is related.

The computer program of the present invention further causes the computer to execute the processing comprising:

allowing an application, which uses data, to search the objects stored in the storage system for an object, required by the application, based on the ancillary information; and reading only a part of object data based on the ancillary information and the data part information related to the ancillary information.

An apparatus in accordance with another aspect of the present invention is a data management apparatus that manages access to data of an object, the data management apparatus comprising: a means that stores and manages ancillary information and data part information, in association with an object ID which identifies an object, as metadata of the object in an object data storage unit separately from a storage unit in which the object data is stored, the ancillary information used to represent or describe contents of data of the object, the data part information indicating to which data area of the object the ancillary information is related.

The apparatus of the present invention further comprises a means that receives a read request from a client, searches the object metadata storage unit using an object ID and ancillary information specified by the read request, and selectively reads a data part of object data, corresponding to the ancillary information, from the storage in which the object data is stored.

The apparatus of the present invention may be configured such that the object metadata storage unit stores, in association with the object ID, a data format of the object data and storage location address information on the object data.

The data management apparatus of the present invention further comprises a means that receives a read request from a client, searches the object metadata storage unit using an object ID and ancillary information specified by the read request, and generates an object data read command corresponding to a data format and data part information; and a means that selectively reads a data part of the object data, corresponding to the ancillary information, from the storage unit in which the object data is stored.

The data management apparatus of the present invention may be configured such that the data format of the object data includes a file format and a database format and that the means that generates an object data read command generates a file read instruction or a database data read instruction according to the data format of the object.

The data management apparatus of the present invention may be configured such that, when an object generation or update request is received from the client, the data management apparatus generates an object generation or update command according to the data format of the object and sends a file creation or update instruction to a file server that is a storage destination of the object data or sends a table creation or update instruction to a database server that is a storage destination of the object data.

The data management apparatus of the present invention may be configured such that, when an ancillary information addition request is received from the client, the data management apparatus adds the ancillary information and data part information corresponding to the added ancillary information to the object metadata storage unit.

The data management apparatus of the present invention may be configured such that, when an object list request is received from the client, the apparatus extracts object IDs, which match ancillary information specified by the request, and displays a list of data formats, ancillary information, and data part information.

A data management apparatus in another aspect of the present invention is a data management apparatus that manages access to data of an object, comprising a first storage area (first table) in which ancillary information and data part information, in association with an object ID which identifies an object, are stored and managed as metadata of the object, the ancillary information used to represent or describe contents of data of the object, the data part information indicating to which data area of the object the ancillary information is related; a second storage area (second table) in which a data format of the object and information on a storage location address where the data of the object is stored, in association with the object ID, are stored and managed; a means that receives a read request from a client and, based on an object ID specified by the read request, generates an object data read command corresponding to the data format information and the data part information by referencing the first storage area and the second storage area; and a means that selectively reads a data part of object data, corresponding to the ancillary information, from a file server or a database server in which the data of the object is stored.

A data management apparatus in still another aspect of the present invention comprises a message transfer/analysis unit that receives an object data access request, sent from a client, and returns a response; an object metadata storage unit that stores a set of ancillary information on data on an object and a data area corresponding to the ancillary information as metadata on the object; an object metadata management unit that processes metadata on objects and, in response to a request from the message transfer/analysis unit, manages an execution of reading, update, and registration of metadata stored in the object metadata storage unit; a data access unit that connects to the file server and the database server; and a data conversion unit that generates a data access command, corresponding to the file server or the database server, in response to a request from the message transfer/analysis unit, sends the data access command to the data access unit, and extracts object data from response data sent from the data access unit for sending the extracted object data to the message transfer/analysis unit wherein the data access unit
    sends the data access command, specified by the data conversion unit, to the file server and the database server and sends response data, received from the file server or the database server, to the data conversion unit.

In the data management apparatus of the present invention, the object metadata storage unit includes
    object ID information uniquely identifying object data,
    data format information indicating a data format of an object,
    data storage location address information indicating address information on an object data storage location,
    ancillary information representing contents of data for determining contents of object data, and
    data part information indicating a position of data corresponding to the ancillary information.

The data management apparatus of the present invention may be configured such that
(a1) when an object creation request, for which a data format and ancillary information representing whole object data to be created are specified, is received from the client, the message transfer/analysis unit extracts the data format information and the ancillary information from the object creation request and
sends the data format information, the ancillary information, and the object creation request to the object metadata management unit,
(a2) the object metadata management unit
    generates an object ID based on the ancillary information, determines a data storage location address at which the object is to be stored, establishes a relation among the object ID information, data format information, ancillary information, and data storage location address information and stores the related information in the object metadata storage unit, and sends the object ID and the data storage location address information to the message transfer/analysis unit,
(a3) the message transfer/analysis unit
    sends an object creation request, for which the object ID, data storage location address information, and data format information are specified, to the data conversion unit, (a4) the data conversion unit
    creates an object creation command corresponding to the specified data format and sends the object creation command, corresponding to the data format, to the data access unit,
(a5) the data access unit
    based on the object creation command,
    sends a file creation command to the file server if the object is a file,
    sends a table creation command to the database server if the object is a database, and
    if a response is returned from the file server or the database server indicating that object creation processing is executed successfully,
    notifies to the data conversion unit that the file or table creation request is executed successfully,
(a6) the data conversion unit
    notifies to the message transfer/analysis unit that the object creation request is executed successfully when the notification is received from the data access unit notifying that the file or table creation request is executed successfully, and
(a7) the message transfer/analysis unit
    receives the notification, which notifies that the object creation request is executed successfully, from the data conversion unit and notifies the object ID, as well as the notification that the object creation request is executed successfully, to the client.

The data management apparatus of the present invention may be configured such that
(b1) when an object data update request, for which the object ID, data format, object data, and data update position information are specified, is sent from the client, which receives the notification notifying that the object creation request is executed successfully, to the message transfer/analysis unit, the message transfer/analysis unit
    extracts the object ID and the object data from the object data update request received from the client and sends an extraction request, which requests to extract data storage location address information and data format information using the object ID as the key, to the object metadata management unit,
(b2) the object metadata management unit
    extracts data storage location address information and data format information, included in information related to the object ID, from the object metadata storage unit based on the extraction request and sends the extracted information to the message transfer/analysis unit
(b3) the message transfer/analysis unit
    sends the data storage location address information and the data format information, sent from the object metadata management unit, and the object data and the data update position information sent from the client, as well as the object data update request, to the data conversion unit,
(b4) the data conversion unit converts the request from the message transfer/analysis unit to an object update command based on the given data format for processing by the data conversion unit and sends the update command, for which the object data is specified, to the data access unit, and
    the data access unit sends the update command and object data to the file server or the database server based on the object update request from the data conversion unit, and
(b5) processing of response data, which indicates that the update request is executed successfully, from the file server or the database server is passed through the data access unit, the data conversion unit, and the message transfer/analysis unit, and a notification, which notifies that the object data update request is executed successfully, is sent from the message transfer/analysis unit to the client.

A system of the present invention comprises a data management apparatus, a client, a file server, and a database server.

The system of the present invention may be configured such that (c1) the client
sends an ancillary information addition request, for which
object ID to which ancillary information is to be added,
data format information,
ancillary information, and
data part information corresponding to the ancillary information are specified, to the message transfer/analysis unit of the data management apparatus, (c2) the message transfer/analysis unit
extracts the object ID, data format information, ancillary information, and data part information corresponding to the ancillary information from the request and sends the data part information and the ancillary information addition request to the object metadata management unit, (c3) the object metadata management unit
extracts metadata on the corresponding object from the object metadata storage unit using the object ID, included in the data part information, compares the data format information included in the data part information with data format information registered in the object metadata storage unit to confirm that the data formats match, if the data format information specified by the client matches the data format information registered in the object metadata storage unit, if the data format is a file and is a stream-type data format, and if data area ancillary information corresponding to the ancillary information is specified in a form of an offset time and an elapsed time from the offset, notifies information indicating that an offset byte and a byte range corresponding to the offset time and the elapsed time from the offset is required, as well as object storage location address information and the data format, to the message transfer/analysis unit, (c4) the message transfer/analysis unit
sends the object storage location address information, offset time, and elapsed time from the offset, notified from the object metadata management unit, as well as an offset byte and byte range acquisition request, to the data conversion unit, (c5) the data conversion unit
generates a data read command, which will be sent to the file server, from the object storage location address information sent from the message transfer/analysis unit and acquires file data from the file server via the data access unit, expands stream-type data from the acquired file data and file format, analyzes an offset and a range thereof on a storage basis, which correspond to the offset time and the elapsed time from the offset, and sends the analyzed information to the message transfer/analysis unit, (c6) the message transfer/analysis unit
sends the acquired offset and range to the object metadata management unit, (c7) the object metadata storage unit
adds the ancillary information, which is specified to be added, and the data part information, which has the offset and the range on a storage basis as data and which corresponds to the ancillary information, to the object metadata on the object ID to which the ancillary information is specified to be added, saves the object metadata in the object metadata storage unit, and notifies the message transfer/analysis unit that the addition request is executed successfully, and (c8) the message transfer/analysis unit
receives a response from the object metadata management unit and notifies a response result to the client.

In the system of the present invention, (d1) if the data format information specified by the client matches data format information registered in the object metadata storage unit and if the data format is a file but is not a stream-type data format, the object metadata management unit adds the ancillary information, which is specified to be added, and the data part information corresponding to the ancillary information to the object metadata on the object ID to which the ancillary information is specified to be added, saves the object metadata in the object metadata storage unit, and notifies the message transfer/analysis unit that the addition request is executed successfully, and (d2) the message transfer/analysis unit
receives a response from the object metadata management unit and notifies a response result to the client.

In the system of the present invention, (e1)) the client
sends ancillary information related to object data, as well as an object list acquisition request, to the message transfer/analysis unit of the data management apparatus, (e2) the message transfer/analysis unit
extracts the ancillary information, included in the object list acquisition request received from the client, and sends the ancillary information and the object list acquisition request to the object metadata management unit, (e3) the object metadata management unit
extracts object IDs having ancillary information, which matches the specified ancillary information, from the object metadata storage unit and sends the extracted object IDs, as well as data format information, object storage location address information, ancillary information related to the objects, and data part information related to the ancillary information, to the message transfer/analysis unit, and (e4) the message transfer/analysis unit
creates a list of data format information, ancillary information, and data part information related to the ancillary information for each object ID based on the information sent from the object metadata management unit, and returns the created list to the client.

In the system of the present invention (f1)) the client selects an object, from which data is to be acquired, based on the information on the list concerning the object IDs and sends a data read request, for which an object ID, object storage location address information, data format information, ancillary information, and data part information related to the ancillary information are specified, to the message transfer/analysis unit of the data management apparatus, (f2) the message transfer/analysis unit transfers an object data read request, for which the object storage location address information, data format information, and data part information related to the ancillary information are specified, to the data conversion unit, (f3) the data conversion unit generates a data read command, which will be executed in the file server or the database server where objects are stored, based on the data format information, data storage location address information, and data part information related to the ancillary information transferred from the message transfer/analysis unit, and sends the generated data read command to the data access unit, a part of object data, which is returned from the file server or database server and is related to the ancillary information, is sent to the client via the data access unit, data conversion unit, and message transfer/analysis unit, and the data read command is a file read request based on a file path name, which is the data storage location address information, and an offset byte and a byte range, which are the data part information related to the ancillary information, if the data format indicates a file or a database read request based on a table name, which is the data storage location address information, and an SQL (Structured Query Language) query, which is the data part information related to the ancillary information, if the data format indicates a database.

In accordance with another aspect of the present invention, there is provided a method comprising the stops of:

mapping data having a plurality of data formats into objects having a common format for consolidated data access; and assigning ancillary information to an object and saving the ancillary information by relating thereto data part information, the ancillary information used to represent or describe contents of data, the data part information indicating to which data area of the object the ancillary information is related.

In the present invention, the method further comprises the steps of:

searching for an object based on the ancillary information; and reading a part of object data based on the ancillary information and the data part information related to the ancillary information.

A method in accordance with further aspect of the present invention is a data management method that manages access to data of an object, comprising the steps of:

storing and managing ancillary information and data part information, in association with an object ID which identifies an object, as metadata in a first storage area (first table) and storing and managing a data format of the object and information on a storage location address, where the data of the object is stored, in association with the object ID in a second storage area (second table), the ancillary information used to represent or describe contents of data of the object, the data part information indicating to which data area of the object the ancillary information is related;

receiving a read request from a client and, based on an object ID specified by the read request, generating an object data read command corresponding to the data format information and the data part information by referencing the first storage area and the second storage area using an object ID specified by the read request; and selectively reading a data part of object data, corresponding to the ancillary information, from a file server or a database server in which the data of the object is stored.

The present invention allows an application to access necessary data based on ancillary information assigned to an object, without cooperation with another application, when multiple applications access data via the data management apparatus.

The present invention assigns ancillary information to an object and so, when a new application is introduced, allows already-created data to be used as data assets.

In addition, the present invention allows the user to read only data in a part related to ancillary information, based on the ancillary information and data part information related to the ancillary information, thus reducing unnecessary data reading processing.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3 is a diagram showing an example of metadata stored in an object metadata storage unit in one exemplary embodiment of the present invention.

FIG. 8 is a flowchart showing the operation of the object data read processing in one exemplary embodiment of the present invention.

PREFERRED MODES

Figure 1:
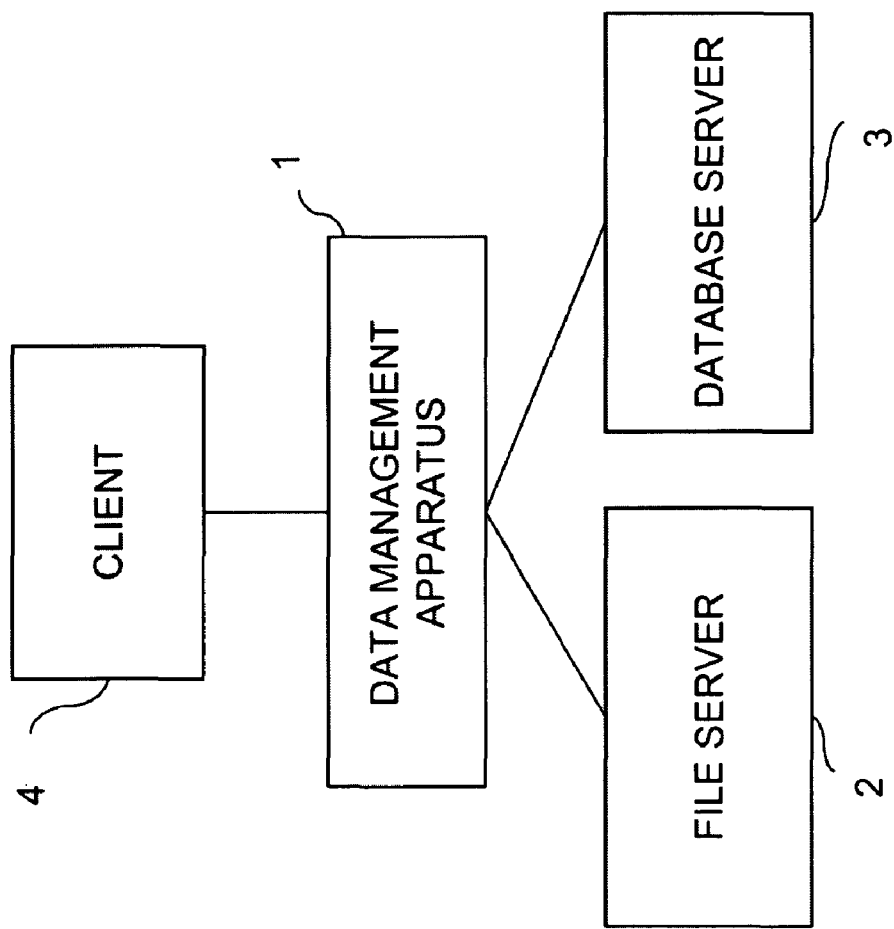
FIG. 1 is a diagram showing the system configuration of one exemplary embodiment of the present invention.

The present invention described above will be described more in detail below with reference to the attached drawings. The present invention stores and manages ancillary information (also called "annotation"), which is used to represent or describe the contents of data on an object, and data part information, which indicates to which data area of the object the ancillary information is related, in association with an object ID which identifies an object, in an object metadata storage unit (103 in FIG. 2) as the metadata of the object, separately from a repository (for example, a file apparatus or a database) in which the object data is stored (see FIG. 3B). The object metadata storage unit (103 in FIG. 2) also stores and manages the data format of the object and the data storage location address information on the object, in association with the object ID (see FIG. 3A).

A data management apparatus according to the present invention receives a read request from a client, searches the object metadata storage unit using an object ID and ancillary information specified by the read request, generates an object data read command corresponding to the data format, corresponding to the object ID, and the data part information related to the ancillary information, sends the object data read command to a storage unit in which the object data is stored, and selectively reads a data part of the object data, corresponding to the ancillary information, from the storage unit in which the data of the object is stored. The format of the object includes, for example, a file format and a database format. The means that generates the object data read command generates a file read instruction or a database read instruction according to the data format of the object.

A data management apparatus according to the present invention may be configured such that, when an object generation or update request is received from the client, the data management apparatus generates an object generation or update command according to the data format of the object, and sends a file creation or update instruction to a file server in which the object data is stored or sends a table creation or update instruction to a database server in which the object data is stored.

A data management apparatus of the present invention may also be configured such that, when an ancillary information addition request is received from the client, the data management apparatus adds the ancillary information and the data part information, corresponding to the added ancillary information, to the object metadata storage unit.

A data management apparatus of the present invention may also be configured such that, when an object list request is received from the client, the data management apparatus extracts object IDs that match the ancillary information specified for the request and displays a list of data formats, ancillary information, and data part information.

As described above, the present invention provides an apparatus that integrates data storage apparatuses with different data storage means, such as a file and a database, for integrally managing different types of data. In order to use stored data as information having specific meaning, the apparatus manages a meaning and a data area related to the meaning and performs data access control. The following describes exemplary embodiments.

FIG. 1 is a diagram showing the system configuration of one exemplary embodiment of the present invention. This exemplary embodiment comprises at least one client 4, at least one file server 2, at least one database server 3, and a data management apparatus 1. The data management apparatus 1 is sometimes called an "consolidated data management apparatus" because of its function.

The client 4 accesses data, stored in the file server 2 and the database server 3, via the data management apparatus 1.

In the client 4, an application that issues a data processing request for creating data or reading data is running and, in response to a request from the application, the client 4 issues a data processing request to the data management apparatus 1.

Figure 2:
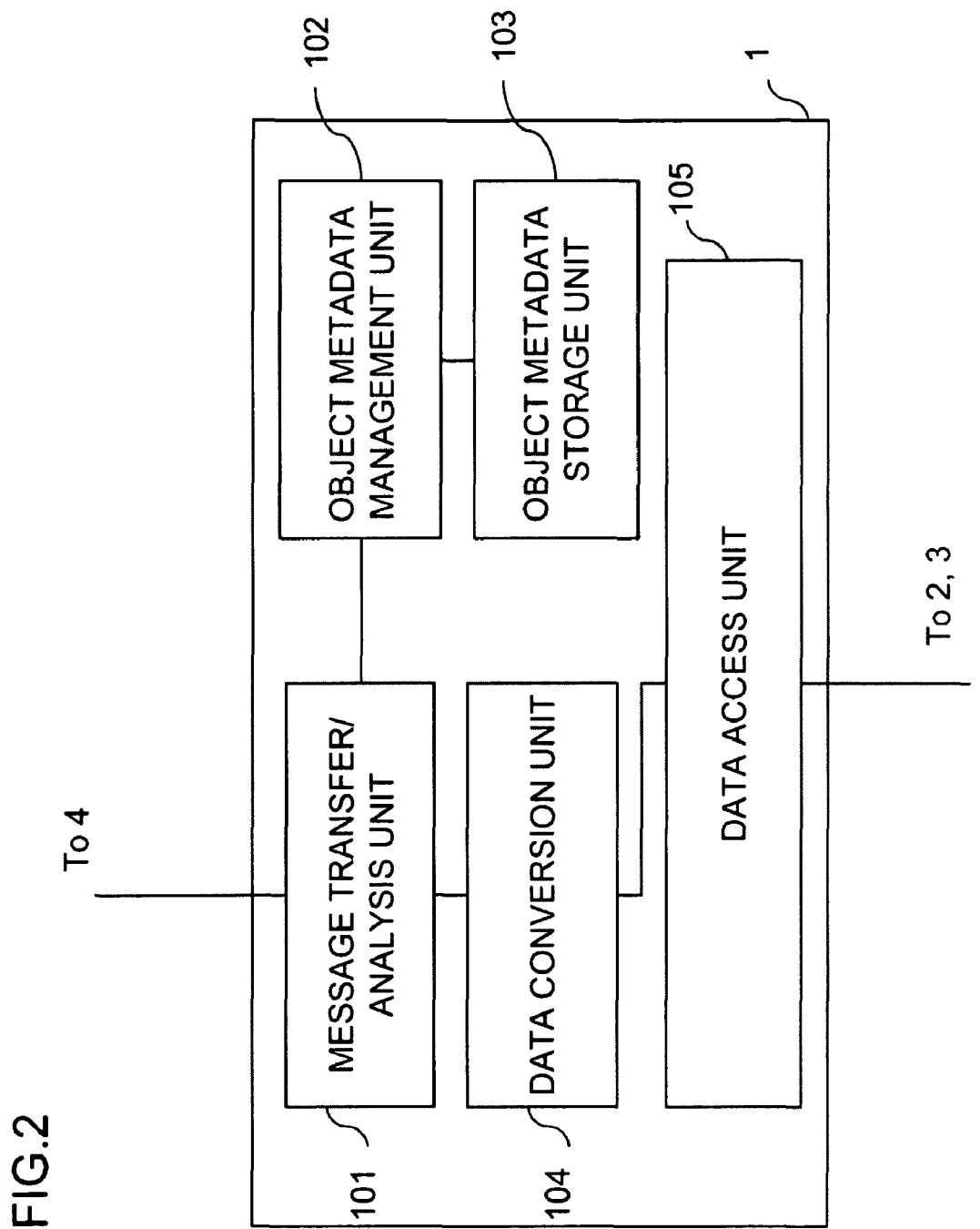
FIG. 2 is a diagram showing the internal configuration of a data management apparatus in one exemplary embodiment of the present invention.

FIG. 2 is a diagram showing the configuration of the data management apparatus 1 shown in FIG. 1. The data management apparatus 1 comprises a message transfer/analysis unit 101, an object metadata management unit 102, an object metadata storage unit 103, a data conversion unit 104, and a data access unit 105.

The message transfer/analysis unit 101 analyzes the content of an object data access request which has been transferred from the client 4 and, according to the processing request, passes the processing to other components in the data management apparatus 1. The message transfer/analysis unit 101 also accepts a processing result from other components and sends a response, received in response to the processing request, to the client 4.

The object metadata management unit 102 handles metadata on object data as follows:
Address information on data storage location;
Format of data in data storage location;
Ancillary information representing contents of data; and
Data area corresponding to ancillary information.

And, the object metadata management unit 102 performs processing for the metadata, stored in the object metadata storage unit 103, in response to a request from the message transfer/analysis unit 101. The processing of the object metadata management unit 102 is as follows:
Read;
Update; and
Register.
Note that the processing given above is an example of the processing of the object metadata management unit 102 and that the processing is not, of course, limited to this processing.

The data conversion unit 104 generates a data access command, provided for use in the file server 2 and the database server 3, in response to a request from the message transfer/analysis unit 101 and transfers a data access request to the data access unit 105.

The data conversion unit 104 extracts information such as object data, command execution status, and so forth from the response data, received from the data access unit 105, and transfers the extracted information to the message transfer/analysis unit 101.

The data access unit 105 transfers a data access command, specified by the data conversion unit 104, using the communication protocol used in the file server 2 or the database server 3 shown in FIG. 1.

The data access unit 105 transfers response data, received from the file server 2 or database server 3, to the data conversion unit 104. When executing the processing, the data access unit 105 manages the IP address, server name, and login account of the file server 2 or the database server 3 and connects between the data management apparatus 1 and the file server 2 or the database server 3.

<Configuration of Metadata on Object>

In this exemplary embodiment, object metadata stored in the object metadata storage unit 103 of the data management apparatus 1 comprises the following data though not limited thereto.

(A) Object ID Information:
An object ID is used to uniquely identify object data stored via the data management apparatus 1. An object ID is added when an object is created.

(B) Data Format Information:
Data format information, which is data indicating the data format of an object, depends on the data storage means of the data storage connected to the data management apparatus 1.

Two types of storage servers, file server 2 and database server 3, are connected in this exemplary embodiment and, so, there are two types of data formats, a file and a database.

Supplementary information on the format of a file or a database includes:
in case of the file,
Data indicating a type of the file, such as a text, an image, a voice, a moving image or the like, and.
in case of the database,
Columns of tables composing an object, data format of data in the columns.

(C) Data Storage Location Address Information:
The data storage location address information is data indicating address information on an object data storage location. When object data is stored in the file server 2, this information includes path information on the file of the object. When object data is stored in the database server 3, this information includes database name and table name of the object.

(D) Ancillary Information:
Ancillary information is information indicating contents of data using, for example, a keyword for determining the content of object data. Ancillary information may be given also to a part of data in object data. This means that, for stream type data such as a moving image, ancillary information may be given to a part of data selected from a stream. When object data is stored in a database, ancillary information may also be given to a part of data, defined as an object, for determining the content of the data. In order to distinguish ancillary information belonging to different classifications but having the same name or same value, the ancillary information includes an ancillary information classification name indicating the classification of the ancillary information.

(E) Data Part Information Corresponding to Ancillary Information

Ancillary information may be given to a part of object data.

The data part information is information indicating the position of data corresponding to the ancillary information. If the object data is file data, there is given data part information which is indicated, in general, by an offset byte and a byte range.

If the object data is stored in a stream-type moving image file, the part information may be represented by using an offset time (or frame) and an elapsed time (number of frames) from the offset instead of an offset byte and a byte range.

If the object data is stored in a database, an SQL (Structured Query Language) query may be used to specify a part of data.

To relate ancillary information to the whole object data, the data part information should not be specified for the ancillary information. If the data part information is not specified, the ancillary information is applied to the whole object data.

FIG. 3 is a diagram schematically showing an example of the format of object metadata (A) to (E) stored and managed in the table format in the object metadata storage unit (103 in FIG. 2). A table (also called an "object management table") 200 in FIG. 3A is a table for managing the data (A)-(C) described above. An entry of the table 200 has the object ID information, data format information, data format supplementary information, and data storage location address information. FIG. 3A indicates that the object having the object ID XXXXXXX is FILE, its data format supplementary information is video/avi (video file/audio file), and its storage location address is ¥¥ServerA¥DirA¥FileA and that the object having the object ID YYYYYYY is DB, its data format supplementary information is (Key1 is Int(integer), Key2 is Char(character type), Key3 is Int(integer), and its storage location is ¥¥NodeA¥DBA¥TableA.

A table 201 in FIG. 3B, a table (also called an "ancillary information management table") for managing the data in (D) and (E) described above, is stored and managed in the table format in the object metadata storage unit (103 in FIG. 2). The table includes: the ancillary information classification name; ancillary information; data part information; and object ID. The ancillary information classification name KeyA has the ancillary information ValueA, the data part information is "0,100", and the object ID is XXXXXXX. This object has the data format FILE, and the data part information corresponding to the ancillary information ValueA is indicated by the offset 0 and the length 100. The next ancillary information classification name KeyA has the ancillary information ValueB, the data part information is "50,120", and the object ID is XXXXXXX. This object has the data format FILE, and the data part information corresponding to the ancillary information ValueB is indicated by the offset 50 and the length 120. The ancillary information classification name KeyB has the ancillary information ValueC, the data part information is indicated by "Select Key1, Key2 From TableA Where Key2=B", the object ID is YYYYYYY, and the data format of this object is DB. The data part information corresponding to the ancillary information ValueC is obtained from the table TableA in the database using the SQL statement Select Key1, Key2 From TableA Where Key2=B. Note that the management of the object ID and the management mode of the data format, object data storage location address, ancillary information, and data part information are not of course limited to the configuration and the format indicated by the tables 200 and 201 shown in FIG. 3.

<Procedure for Object Creation and Object Data Update>

Figure 4:
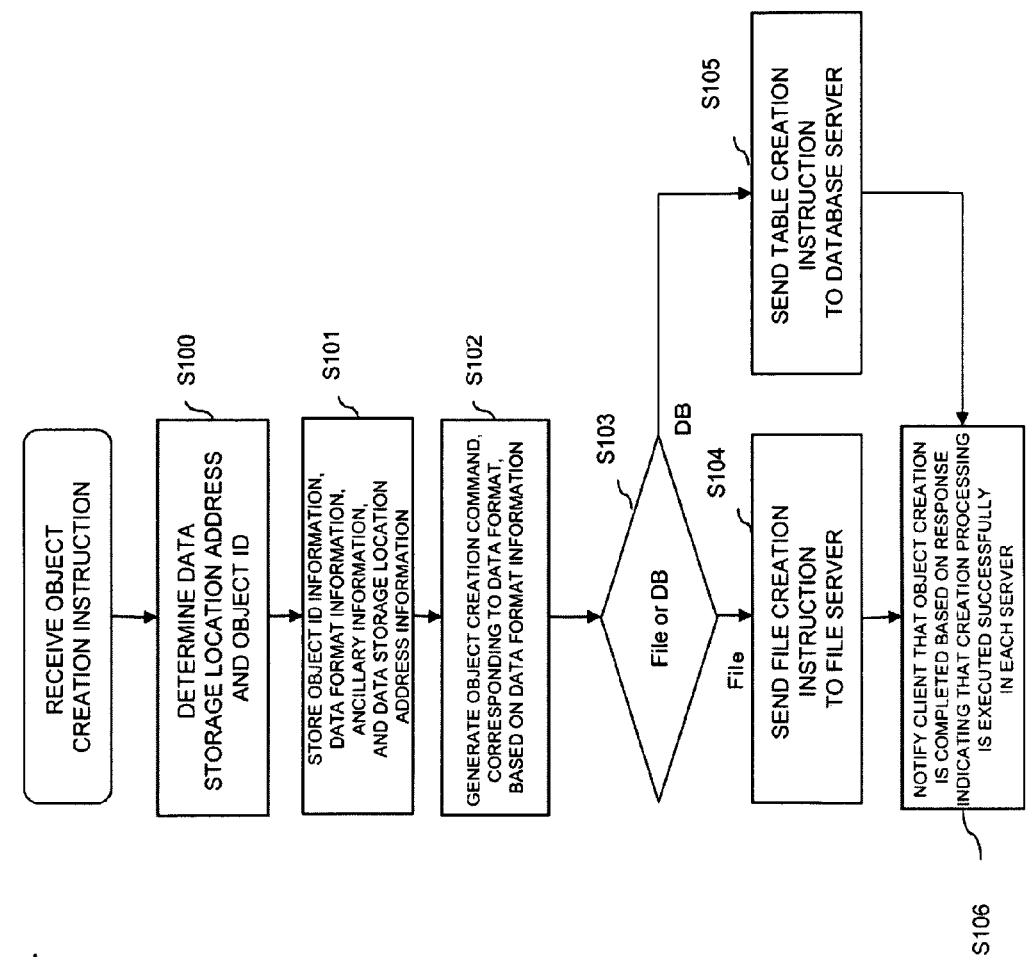
FIG. 4 is a flowchart showing the operation of the object creation processing in one exemplary embodiment of the present invention.
Figure 5:
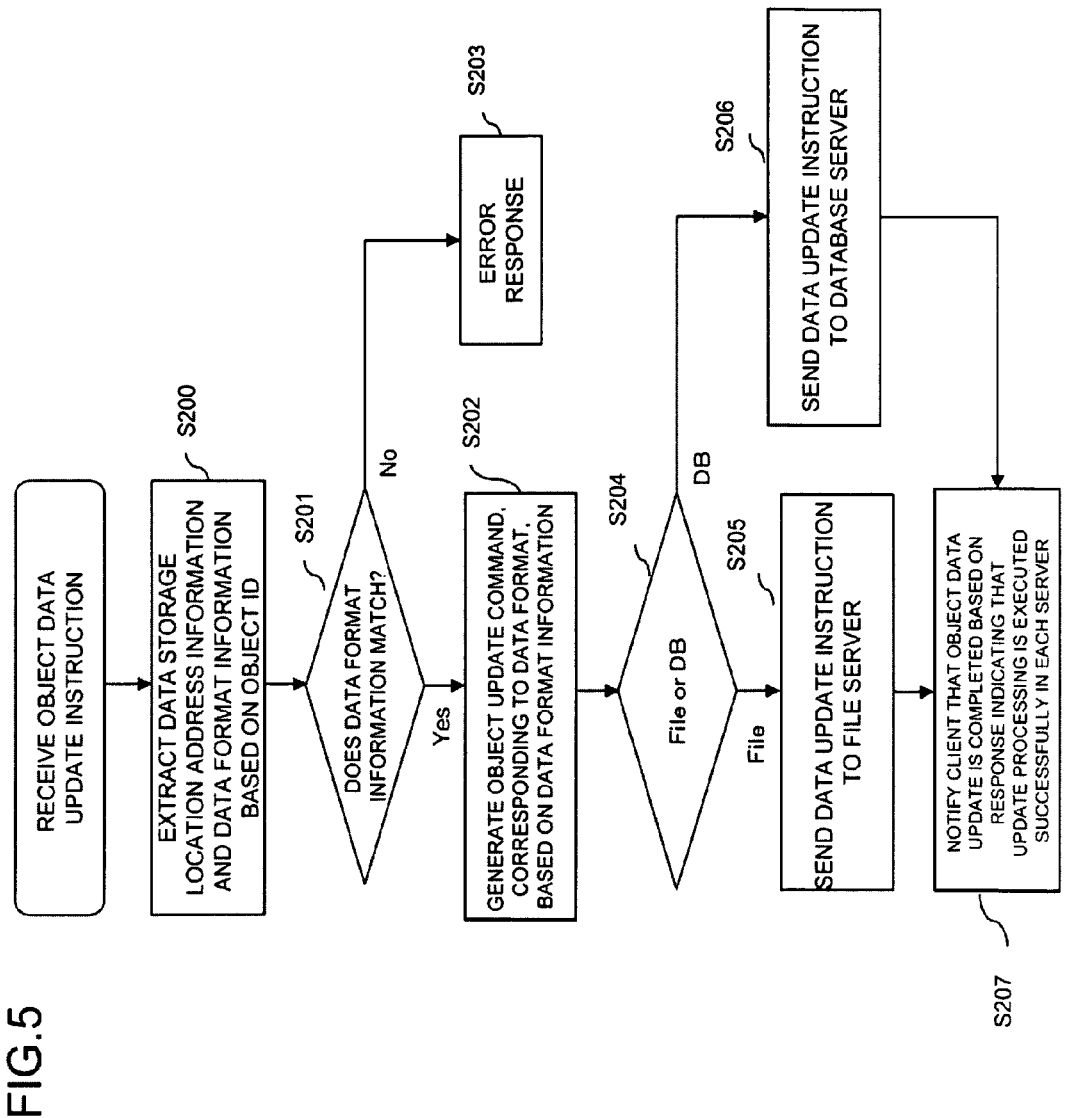
FIG. 5 is a flowchart showing the operation of the object data update processing in one exemplary embodiment of the present invention.

The procedure for creating an object via the data management apparatus 1 in response to a request from the client 4 will be described below with reference to the flowcharts in FIG. 4 and FIG. 5. FIG. 4 shows the procedure for the object creation processing. FIG. 5 shows the procedure for the object update processing.

In this exemplary embodiment, it is assumed that all clients, which create an object, create it from data based on the predefined, uniform moving-image format, image format, and voice format.

First, the client 4 specifies the data format and the ancillary information, which indicates the whole object data to be created, for an object creation request and sends it to the data management apparatus 1. All processing requests received from the client 4 are analyzed by the message transfer/analysis unit 101.

The message transfer/analysis unit 101 extracts the data format information and the ancillary information from the received object creation request and sends the information (data format information, ancillary information) and the object creation request to the object metadata management unit 102.

The object metadata management unit 102 generates a hash value from data, which is the combination of the ancillary information and the current time, as the object ID, determines the data storage location address in which the object is stored (step S100 in FIG. 4), stores the object ID information, data format information, ancillary information, and data storage location address information, which are related with each other, in the object metadata storage unit 103 (step S101 in FIG. 4), and transfers the object ID information and the data storage location address information to the message transfer/analysis unit 101.

The message transfer/analysis unit 101 transfers an object creation request, for which the object ID information, data storage location address information, and data format information are specified, to the data conversion unit 104 based on the object ID information received from the object metadata management unit 102.

The data conversion unit 104 creates an object creation command corresponding to the specified data format, based on the information (object creation request for which the object ID information, data storage location address information, and data format information are specified) received from the message transfer/analysis unit 101 (step S102 in FIG. 4), and transfers the created object creation command to the data access unit 105.

This object creation command is converted to:

a file creation command with the object ID as the file name if the data format indicates that the object is a file, or a table creation command with the object ID as the table name, based on the database configuration information included in the data format information, if the data format indicates that the object is a database.

Based on the object creation command from the data conversion unit 104 (step S103 in FIG. 4), the data access unit 105 transfers the file creation command (instruction) to the file server 2 if the object is a file (step S104 in FIG. 4) or transfers the table creation command (instruction) to the database server 3 if the object is a database (step S105 in FIG. 4).

When response data indicating that the object creation processing has been successfully executed is returned from the file server 2 or database server 3 to the data access unit 105, the data access unit 105 notifies the data conversion unit 104 that the file or table creation request has been executed successfully (step S106 in FIG. 4).

Similarly, the data conversion unit 104 notifies the message transfer/analysis unit 101 that the object creation request has been executed successfully.

The message transfer/analysis unit 101 accepts the notification from the data conversion unit 104 indicating that the object creation request has been executed successfully and notifies the client 4 of the object ID and the information indicating that the object creation request has been executed successfully.

The client 4 accepts the notification, which indicates that the object creation request has been executed successfully, from the message transfer/analysis unit 101, and sends an object data update request to the message transfer/analysis unit 101 with the object ID, data format, object data, and data update position information specified. The data update position information includes the offset byte and byte range information if the data format indicates that the object is a file, or the SQL query information if the data format indicates that the object is a database.

The message transfer/analysis unit 101 extracts the object ID and the object data from the object data update request received from the client 4 and transfers an extraction request, which extracts the data storage location address information and the data format information, to the object metadata management unit 102 with the object ID as the key.

The object metadata management unit 102 extracts the data storage location address information and the data format information, included in the information related to the corresponding object ID, from the object metadata storage unit 103 based on the extraction request (step S200 in FIG. 5) and transfers the extracted data storage location address information and the data format information to the message transfer/analysis unit 101.

During the extraction processing, the object metadata management unit 102 checks if the data format information extracted from the object metadata storage unit 103 and the data format information transferred from the client 4 are different (step S201 in FIG. 5) and if they are different, returns a processing error to the message transfer/analysis unit 101. A processing error response is sent from the message transfer/analysis unit 101 to the client 4 (step S203 in FIG. 5).

The message transfer/analysis unit 101 transfers the data storage location address information and the data format information, transferred from the object metadata management unit 102, and the object data and the data update position information, transferred from the client 4, as well as the object data update request, to the data conversion unit 104.

The data conversion unit 104 converts the object data update request to an object update command for execution by the data access unit 105 according to the given data format in the same way as it converts an object creation request based on the request from the message transfer/analysis unit 101 (step S202 in FIG. 5) and transfers the object update command, for which the object data is specified, to the data access unit 105.

The data access unit 105 transfers the update command and the object data to the file server 2 or the database server 3 in the same way as it does for an object creation request, based on the object update request from the data conversion unit 104 (steps S204-S206 in FIG. 5).

After that, response data sent from the file server 2 and database server 3, which indicates that the update request has been executed successfully, is processed in the same way as for the object creation request described above. That is, the response data is passed from the data access unit 105 to the data conversion unit 104 and then to message transfer/analysis unit 101 in the same way the object creation request described above, and the notification indicating that the object data update request has been executed successfully is sent from the message transfer/analysis unit 101 to the client 4 (step S207 in FIG. 5).

<Procedure for Adding Ancillary Information>

Figure 6:
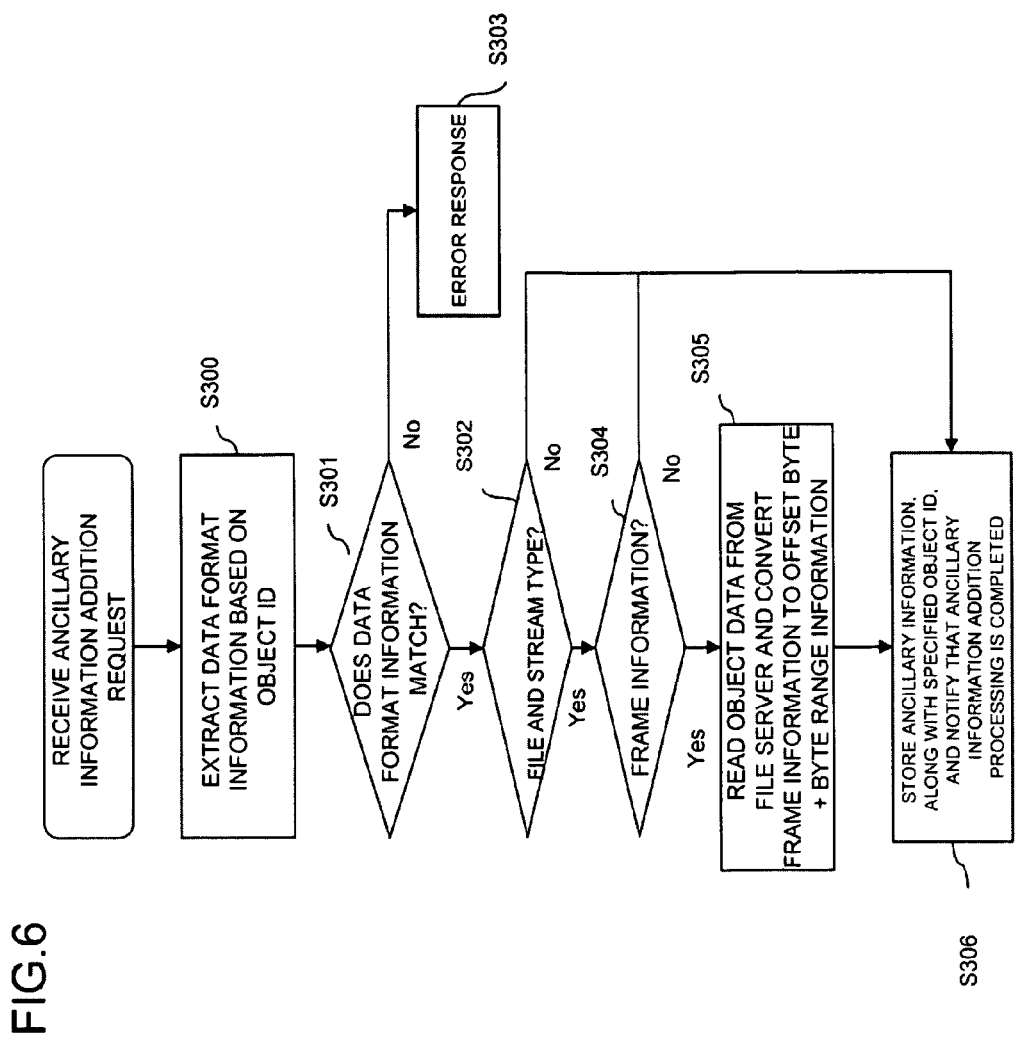
FIG. 6 is a flowchart showing the operation of the ancillary information addition processing in one exemplary embodiment of the present invention.

The following describes the procedure for adding ancillary information to an already-created object in this exemplary embodiment. FIG. 6 is a flowchart showing the procedure for ancillary information addition processing.

Although not limited thereto, the ancillary information is created in this exemplary embodiment as following;

An application running in the client 4 analyzes data to derive ancillary information, or A general user who operates the client 4 derives ancillary information from the content of an object.

First, the client 4 transfers an ancillary information addition request, for which the following are specified, to the data management apparatus 1.

ID of an object to which ancillary information is to be added;

Data format information;

Ancillary information; and

Data part information corresponding to ancillary information.

The message transfer/analysis unit 101 extracts the object ID, data format information, ancillary information, and data part information corresponding to the ancillary information from the ancillary information addition request received from the client 4 and sends the information and the ancillary information addition request to the object metadata management unit 102.

The object metadata management unit 102 extracts the metadata of the corresponding object from the object metadata storage unit 103 with the object ID, included in the information received from the message transfer/analysis unit 101, as the key (step S300 in FIG. 6) and compares the data format information, included in the information received from the message transfer/analysis unit 101, with the data format information, registered in the object metadata storage unit 103, to confirm that the data formats match (step S301 in FIG. 6).

If the comparison indicates that the data format information included in the information received from the message transfer/analysis unit 101 and the data format indicated by the data format information registered in the object metadata storage unit 103 are different, an ancillary information registration error is generated and a registration error is notified to the client 4 via the message transfer/analysis unit 101 (step S303 in FIG. 6).

The object metadata management unit 102 checks if the data format information specified by the client 4 matches the data format information registered in the object metadata storage unit 103, if the data format is a file and is a stream-type data format (Yes in step S302 in FIG. 6) and if the data area ancillary information corresponding to the ancillary information is specified by an offset time (frame) and an elapsed time (number of frames) from the offset (S304).

If the above conditions are satisfied, the object metadata management unit 102 notifies the message transfer/analysis unit 101 about the necessity of the offset byte and the byte range, corresponding to the offset time and the elapsed time from the offset, as well as the object storage location address information and the data format.

The message transfer/analysis unit 101 sends the object storage location address information, the offset time, and the elapsed time from the offset notified from the object metadata management unit 102, as well as an offset byte and byte range acquisition request, to the data conversion unit 104.

The data conversion unit 104 generates a data read command, which will be sent to the file server 2, from the object storage location address information sent from the message transfer/analysis unit 101 and transfers the generated data read command to the data access unit 105, and executes the data read command in the file server 2 via the data access unit 105 to acquire file data from the file server 2.

In addition, data conversion unit 104 expands stream-type data from the acquired file data and the file format, analyzes the offset byte and the byte range corresponding to the offset time (frame) and the elapsed time(number of frames) from the offset (step S305 in FIG. 6) and transfers the analyzed information to the message transfer/analysis unit 101. Note that the offset byte and byte range may be the offset and the range in units of words.

The message transfer/analysis unit 101 transfers the acquired offset byte and the byte range to the object metadata management unit 102.

The object metadata management unit 102 adds
Ancillary information specified to be added, and
Data part information that has the offset byte and the byte range as data and that corresponds to the ancillary information
to the object metadata having the object ID to which the ancillary information is to be added, stores the object metadata in the object metadata storage unit 103, and notifies the message transfer/analysis unit 101 that the addition request has been executed successfully.

In response to the response from the object metadata management unit 102 indicating that the addition request has been executed successfully, the message transfer/analysis unit 101 notifies the client 4 of the response result (step S306 in FIG. 6).

If the data format information specified by the client 4
matches the data format information registered in the object metadata storage unit 103 and
If the data format is a file but is not a stream-type data format
the object metadata management unit 102 adds the ancillary information specified to be added and the data part information corresponding to the ancillary information to the object metadata having the object ID to which the ancillary information is to be added, stores the object metadata in the object metadata storage unit 103, and notifies the message transfer/analysis unit 101 that the addition request has been executed successfully.

In response to the response from the object metadata management unit 102 indicating that the addition request has been executed successfully, the message transfer/analysis unit 101 notifies the client 4 of the response result (step S306 in FIG. 6).

<Procedure for Reading an Object>

Figure 7:
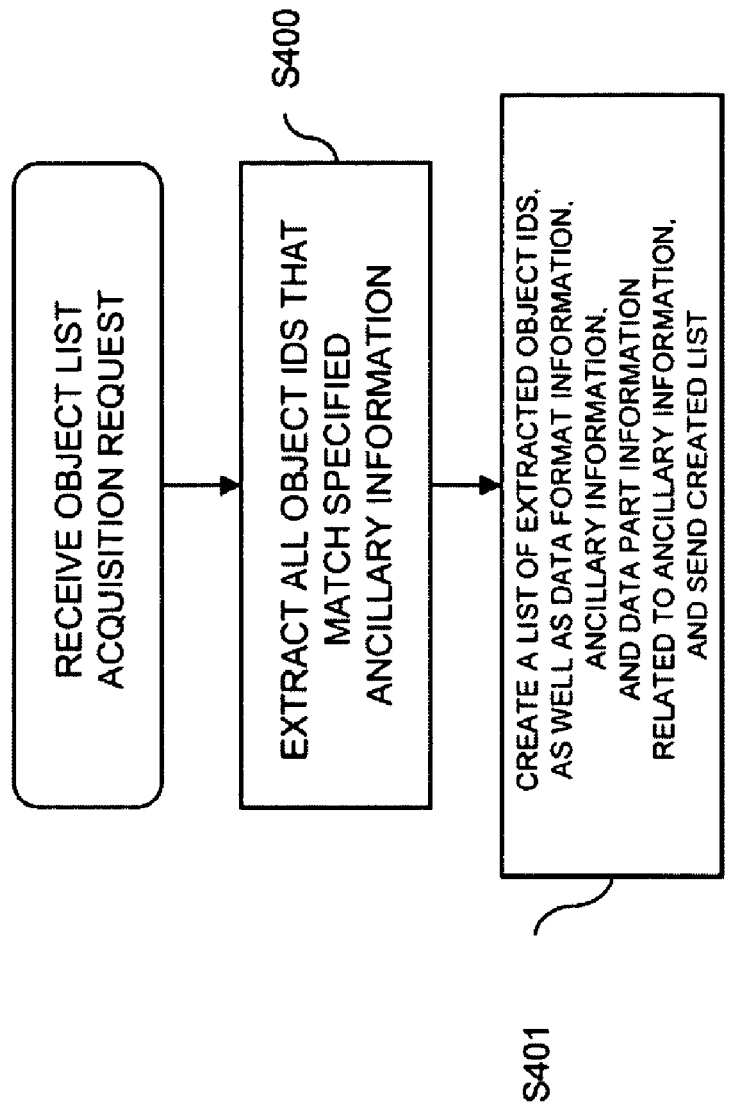
FIG. 7 is a flowchart showing the operation of the object list acquisition processing in one exemplary embodiment of the present invention.

Next, the following describes the procedure used in this exemplary embodiment for extracting an object, requested by the client 4 using ancillary information, from the objects that have been created and for reading only the object data related to the ancillary information. FIG. 7 is a flowchart showing the procedure for acquiring a list of objects. FIG. 8 is a flowchart showing the procedure for reading an object.

First, the client 4 sends the ancillary information related to object data to be read, as well as an object list acquisition request, to the data management apparatus 1.

The message transfer/analysis unit 101 extracts the ancillary information included in the object list acquisition request received from the client 4 and sends the extracted ancillary information and the object list acquisition request to the object metadata management unit 102.

The object metadata management unit 102 extracts all object IDs having the ancillary information, which matches the specified ancillary information, from the object metadata storage unit 103 (step S400 in FIG. 7) and transfers the extracted object IDs, as well as the data format information, all ancillary information related to the objects, and data part information related to the ancillary information, to the message transfer/analysis unit 101.

The message transfer/analysis unit 101 creates a list of data format information, ancillary information, and data part information related to the ancillary information for each object ID based on the information (object ID, data format information, all ancillary information related to the objects, data part information related to the ancillary information) transferred from the object metadata management unit 102 and returns the created list to the client 4 (step S401 in FIG. 7).

The client 4 selects an object, from which data is to be acquired, based on the information on the list concerning the object IDs transferred from the message transfer/analysis unit 101 and sends a data read request, for which the object ID, data format information, and ancillary information are specified, to the data management apparatus 1.

The message transfer/analysis unit 101 extracts (S500) the object ID, data format information, and ancillary information, included in the object read request received from the client 4 and sends an object metadata acquisition request, as well as the extracted object ID and data format information, to the object metadata management unit 102.

The object metadata management unit 102 extracts object metadata, which matches the object ID, from the object metadata storage unit 103 and compares the extracted data format information with the data format information, received from the message transfer/analysis unit 101, to check if the data formats match (step S501 in FIG. 8).

If the comparison indicates that the data format information included in the information received from the message transfer/analysis unit 101 and the data format indicated by the data format information registered in the object metadata storage unit 103 are different, an ancillary information registration error is generated and a processing error is notified to the client 4 via the message transfer/analysis unit 101 (step S503 in FIG. 8).

If the data format information specified by the client 4 matches the data format information registered in the object metadata storage unit 103, the object metadata management unit 102 transfers the data storage location information and the data part information related to the ancillary information to the message transfer/analysis unit 101 as the metadata corresponding to the object ID and the ancillary information specified by the message transfer/analysis unit 101.

The message transfer/analysis unit 101 sends an object data read request, as well as the object storage location address information, data format information, and data part information related to the ancillary information, to the data conversion unit 104.

The data conversion unit 104 generates a data read command (step S502 in FIG. 8), which will be executed in the file server 2 or the database server 3 where objects are stored, based on the data format information, data storage location address information, and data part information related to the ancillary information transferred from the message transfer/analysis unit 101, and transfers the generated data read command to the data access unit 105.

If the data format indicates that the object is a file, the data read command is a file read request based on the file path name, which is the data storage location address information, and the offset byte and the byte range which are the data part information related to the ancillary information.

If the data format indicates that the object is a database, the data read command is a database read request based on the table name, which is the data storage location address information, and the SQL query which is the data part information related to the ancillary information.

The data access unit 105 determines the command transfer destination based on the data read command received from the data conversion unit 104 (step S504 in FIG. 8) and sends the data read request to the file server 2 or the database server 3 (step S505 or S506 in FIG. 8).

Out of the object data, returned from the file server 2 or the database server 3 based on the data read request, only a part of the object data related to the ancillary information is sent to the client 4 via the data access unit 105, data conversion unit 104, and message transfer/analysis unit 101 (step S507 in FIG. 8).

Note that, if the data part information related to the ancillary information is not registered in the data management apparatus 1 for the ancillary information specified when the read request is requested by the client 4, the whole object data is sent to the client 4.

According to the present invention, when an object is created by an object creator or an object creating application, an object-data-content analyzing application or user can freely specify ancillary information, which indicates contents of data, for a data area specified by the analyzing application or user without considering the object created by the object creator or object creating application. Because of this, the user can extract and use object data from multiple analysis points of view and various applications can use data, stored in heterogeneous storage systems, via the consolidated data management base.

The ability to extract and use object data, not on an object basis, but on a data area basis related to ancillary information, provides an application with only the minimum data part required by the application even if the data size of the object is very large.

For this reason, the data processing efficiency and speed of an application that uses data can be increased.

While the present invention has been described with reference to the exemplary embodiment above, it is to be understood that the present invention is not limited to the configuration of the exemplary embodiment above and that modifications and changes that may be made by those skilled in the art within the scope of the present invention are included.

The exemplary embodiment and the examples may be changed and adjusted in the scope of all disclosures (including claims) of the present invention and based on the basic technological concept thereof. In the scope of the claims of the present invention, various disclosed elements may be combined and selected in a variety of ways.

What is claimed is:

1. A data management apparatus comprising:
a message transfer/analysis unit that receives an object data access request, sent from a client, and returns a response;
an object metadata non-transitory storage unit that stores a set of ancillary information on data on an object and a data
area corresponding to the ancillary information as metadata on the object;
an object metadata management unit that processes metadata on objects and, in response to a request from the message transfer/analysis unit, manages an execution of reading, update, and registration of metadata stored in the object metadata storage unit;
a data access unit that connects to a file server and a database server; and
a data conversion unit that generates a data access command, corresponding to the file server or the database server, in response to a request from the message transfer/analysis unit, sends the data access command to the data access unit, and extracts object data from response data sent from the data access unit for sending the extracted object data to the message transfer/analysis unit, wherein:
the data access unit sends the data access command, specified by the data conversion unit, to the file server and the database server and sends response data, received from the file server or the database server, to the data conversion unit,
(a1) when an object creation request, for which a data format and ancillary information representing whole object data to be created are specified, is received from the client,
the message transfer/analysis unit extracts the data format information and the ancillary information from the object creation request, and
sends the data format information, the ancillary information, and the object creation request to the object metadata management unit,
(a2) the object metadata management unit generates an object ID based on the ancillary information, determines a data storage location address at which the object is to be stored, establishes a relation among the object ID information, data format information, ancillary information, and data storage location address information and stores the related information in the object metadata storage unit, and sends the object ID and the data storage location address information to the message transfer/analysis unit,
(a3) the message transfer/analysis unit sends an object creation request, for which the object ID, data storage location address information, and data format information are specified, to the data conversion unit,
(a4) the data conversion unit creates an object creation command corresponding to the specified data format and sends the object creation command, corresponding to the data format, to the data access unit, (a5) the data access unit, based on the object creation command, sends a file creation command to the file server if the object is a file, sends a table creation command to the database server if the object is a database, and if a response is returned from the file server or the database server indicating that object creation processing is executed successfully, notifies to the data conversion unit that the file or table creation request is executed successfully, (a6) the data conversion unit notifies to the message transfer/analysis unit that the object creation request is executed successfully when the notification is received from the data access unit notifying that the file or table creation request is executed successfully, and (a7) the message transfer/analysis unit receives the notification, which notifies that the object creation request is executed successfully, from the data conversion unit and notifies the object ID, as well as the notification that the object creation request is executed successfully, to the client.

2. The data management apparatus according to claim 1, wherein the object metadata storage unit includes:

object ID information which uniquely identifies object data;

data format information which indicates a data format of an object;

data storage location address information which indicates address information on an object data storage location;

ancillary information which represents contents of data for determining contents of object data; and data part information which indicates a position of data corresponding to the ancillary information.

3. A system comprising the data management apparatus according to claim 1, the client, the file server, and the database server.

4. A data management apparatus comprising:

a message transfer/analysis unit that receives an object data access request, sent from a client, and returns a response;

an object metadata non-transitory storage unit that stores a set of ancillary information on data on an object and a data area corresponding to the ancillary information as metadata on the object;

an object metadata management unit that processes metadata on objects and, in response to a request from the message transfer/analysis unit, manages an execution of reading, update, and registration of metadata stored in the object metadata storage unit;

a data access unit that connects to a file server and a database server; and a data conversion unit that generates a data access command, corresponding to the file server or the database server, in response to a request from the message transfer/analysis unit, sends the data access command to the data access unit, and extracts object data from response data sent from the data access unit for sending the extracted object data to the message transfer/analysis unit, wherein:

the data access unit sends the data access command, specified by the data conversion unit, to the file server and the database server and sends response data, received from the file server or the database server, to the data conversion unit, (b1) when an object data update request, for which the object ID, data format, object data, and data update position information are specified, is sent from the client, which receives the notification notifying that the object creation request is executed successfully, to the message transfer/analysis unit, the message transfer/analysis unit extracts the object ID and the object data from the object data update request received from the client and sends an extraction request, which requests to extract data storage location address information and data format information using the object ID as the key, to the object metadata management unit, (b2) the object metadata management unit extracts data storage location address information and data format information, included in information related to the object ID, from the object metadata storage unit based on the extraction request and sends the extracted information to the message transfer/analysis unit, (b3) the message transfer/analysis unit sends the data storage location address information and the data format information, sent from the object metadata management unit, and the object data and the data update position information sent from the client, as well as the object data update request, to the data conversion unit, (b4) the data conversion unit converts the request from the message transfer/analysis unit to an object update command based on the given data format for processing by the data conversion unit and sends the update command, for which the object data is specified, to the data access unit, and the data access unit sends the update command and object data to the file server or the database server based on the object update request from the data conversion unit; and (b5) in processing of response data indicating that the update request is executed successfully, received from the file server or the database server, the response data is passed through the data access unit, the data conversion unit, and the message transfer/analysis unit, and a notification, which notifies that the object data update request is executed successfully, is sent from the message transfer/analysis unit to the client.

5. A system comprising a data management apparatus, a client, a file server, and a database server, wherein the data management apparatus comprises:

a message transfer/analysis unit that receives an object data access request, sent from the client, and returns a response;

an object metadata non-transitory storage unit that stores a set of ancillary information on data on an object and a data area corresponding to the ancillary information as metadata on the object;

an object metadata management unit that processes metadata on objects and, in response to a request from the message transfer/analysis unit, manages an execution of reading, update, and registration of metadata stored in the object metadata storage unit;

a data access unit that connects to the file server and the database server; and a data conversion unit that generates a data access command, corresponding to the file server or the database server, in response to a request from the message transfer/analysis unit, sends the data access command to the data access unit, and extracts object data from response data sent from the data access unit for sending the extracted object data to the message transfer/analysis unit, wherein:

the data access unit sends the data access command, specified by the data conversion unit, to the file server and the database server and sends response data, received from the file server or the database server, to the data conversion unit, (c1) the client sends an ancillary information addition request, for which object ID to which ancillary information is to be added, data format information, ancillary information, and data part information corresponding to the ancillary information are specified, to the message transfer/analysis unit of the data management apparatus, (c2) the message transfer/analysis unit extracts the object ID, data format information, ancillary information, and data part information corresponding to the ancillary information from the request and sends the data part information and the ancillary information addition request to the object metadata management unit, (c3) the object metadata management unit extracts metadata on the corresponding object from the object metadata storage unit using the object ID, included in the data part information, compares the data format information included in the data part information with data format information registered in the object metadata storage unit to confirm that the data formats match, if the data format information specified by the client matches the data format information registered in the object metadata storage unit, if the data format is a file and is a stream-type data format, and if data area ancillary information corresponding to the ancillary information is specified in a form of an offset time and an elapsed time from the offset, notifies information indicating that an offset byte and a byte range corresponding to the offset time and the elapsed time from the offset is required, as well as object storage location address information and the data format, to the message transfer/analysis unit, (c4) the message transfer/analysis unit sends the object storage location address information, offset time, and elapsed time from the offset, notified from the object metadata management unit, as well as an offset byte and byte range acquisition request, to the data conversion unit, (c5) the data conversion unit generates a data read command, which will be sent to the file server, from the object storage location address information sent from the message transfer/analysis unit and acquires file data from the file server via the data access unit, expands stream-type data from the acquired file data and file format, analyzes an offset and a range thereof on a storage basis, which correspond to the offset time and the elapsed time from the offset, and sends the analyzed information to the message transfer/analysis unit, (c6) the message transfer/analysis unit sends the acquired offset and range to the object metadata management unit, (c7) the object metadata storage unit adds the ancillary information, which is specified to be added, and the data part information, which has the offset and the range on a storage basis as data and which corresponds to the ancillary information, to the object metadata on the object ID to which the ancillary information is specified to be added, saves the object metadata in the object metadata storage unit, and notifies the message transfer/analysis unit that the addition request is executed successfully, and (c8) the message transfer/analysis unit receives a response from the object metadata management unit and notifies a response result to the client.

6. The system according to claim 5, wherein (d1) if the data format information specified by the client matches data format information registered in the object metadata storage unit and if the data format is a file but is not a stream-type data format, the object metadata management unit adds the ancillary information, which is specified to be added, and the data part information corresponding to the ancillary information to the object metadata on the object ID to which the ancillary information is specified to be added, saves the object metadata in the object metadata storage unit, and notifies the message transfer/analysis unit that the addition request is executed successfully, and (d2) the message transfer/analysis unit receives a response from the object metadata management unit and notifies a response result to the client.

7. The system according to claim 6 wherein (e1) the client sends ancillary information related to object data, as well as an object list acquisition request, to the message transfer/analysis unit of the data management apparatus, (e2) the message transfer/analysis unit extracts the ancillary information, included in the object list acquisition request received from the client, and sends the ancillary information and the object list acquisition request to the object metadata management unit, (e3) the object metadata management unit extracts object IDs having ancillary information, which matches the specified ancillary information, from the object metadata storage unit and sends the extracted object IDs, as well as data format information, object storage location address information, ancillary information related to the objects, and data part information related to the ancillary information, to the message transfer/analysis unit, and (e4) the message transfer/analysis unit creates a list of data format information, ancillary information, and data part information related to the ancillary information for each object ID based on the information sent from the object metadata management unit, and returns the created list to the client.

8. The system according to claim 7 wherein (f1) the client selects an object, from which data is to be acquired, based on the information on the list concerning the object IDs and sends a data read request, for which an object ID, object storage location address information, data format information, ancillary information, and data part information related to the ancillary information are specified, to the message transfer/analysis unit of the data management apparatus, (f2) the message transfer/analysis unit transfers an object data read request, for which the object storage location address information, data format information, and data part information related to the ancillary information are specified, to the data conversion unit, (f3) the data conversion unit generates a data read command targeted for un in the file server or the database server where objects are stored, based on the data format information, data storage location address information, and data part information related to the ancillary information transferred from the message transfer/analysis unit, and sends the generated data read command to the data access unit, a part of object data, which is returned from the file server or database server and is related to the ancillary information, is sent to the client via the data access unit, data conversion unit, and message transfer/analysis unit, and the data read command is a file read request based on a file path name, which is the data storage location address information, and an offset byte and a byte range, which are the data part information related to the ancillary information, if the data format indicates a file, or a database read request based on a table name, which is the data storage location address information, and an SQL (Structured Query Language) query, which is the data part information related to the ancillary information, if the data format indicates a database.

* * * * *